United States Patent [19]

Harhay

[11] 4,146,825

[45] Mar. 27, 1979

[54] ELECTRIC BATTERY POWERED VEHICLE

[76] Inventor: Warren C. Harhay, 6374 Fry Rd., Brookpark, Ohio 44142

[21] Appl. No.: 596,517

[22] Filed: Jul. 16, 1975

[51] Int. Cl.² .............................. H02J 7/10; H02J 7/04
[52] U.S. Cl. ........................................ 320/23; 320/39; 320/29; 320/30
[58] Field of Search .................... 318/139; 320/39, 40, 320/5–7

[56] References Cited

U.S. PATENT DOCUMENTS

| | | | |
|---|---|---|---|
| 3,560,832 | 2/1971 | Kirk | 320/39 X |
| 3,593,100 | 7/1971 | Foster | 320/39 X |
| 3,617,851 | 11/1971 | DuPuy et al. | 320/39 X |
| 3,943,423 | 3/1976 | Hoffman | 320/39 X |
| 3,987,353 | 10/1976 | Macharg | 320/39 |

Primary Examiner—Robert K. Schaefer
Assistant Examiner—W. E. Duncanson, Jr.

Attorney, Agent, or Firm—Watts, Hoffmann, Fisher & Heinke Co.

[57] ABSTRACT

An over-the-road electric storage battery powered vehicle is disclosed in which a motor starting control initiates operation of the vehicle in a manner which simulates initiating operation of an engine driven vehicle. The motor starting control is provided with interlocks which prevent operation of the vehicle when any one of several potentially unsafe conditions is detected.

An on-board transformerless traction battery charger is also provided which is constructed and arranged to: enable the traction batteries to be charged to 100% of their capacity quickly but at controlled rates which are not detrimental to the batteries; automatically accommodate the charger to conventional A.C. single or split phase grounded household power supplies; and, detect interruption of the power supply ground connection and prevent application of power to the traction batteries.

11 Claims, 4 Drawing Figures

ELECTRIC BATTERY POWERED VEHICLE

BACKGROUND OF THE INVENTION

1. Field of the Invention

The present invention relates to electric storage battery powered vehicles and more particularly relates to over-the-road vehicles which utilize prime movers formed by on-board traction batteries and electric motors.

2. Prior Art

Storage battery powered electric motor driven vehicles have been known and used in various forms for many years. One early usage was as passenger cars but because of the size, cost and weight of the necessary traction batteries, along with their limited driving ranges, early passenger vehicles were not desirable compared to internal combustion engine driven vehicles. Commercial production of over-the-road electric passenger vehicles has been virtually nonexistent for many years.

Electric battery powered vehicles have remained in use for relatively specialized purposes, most notably as lift trucks, power dollies, etc., in and around industrial plants. These vehicles have been particularly advantageous because they do not produce noxious exhaust emissions, operate quietly, and are not required to be operated long distances over terrain at high speeds. In industrial applications the vehicles have usually been provided with regular scheduled maintenance and servicing as needed which has reduced the necessity for providing certain safety features which might be required in vehicles which do not receive regular maintenance.

These vehicles have not operated like internal combustion engine powered vehicles with which most of the populace has been familiar, and merely operating them in a safe manner has required a certain degree of experience on the part of the operator. When the traction batteries are connected to the vehicle motor, for example by actuating a key operated switch, the vehicle is fully prepared to operate as soon as an accelerator pedal is depressed or some other similar speed controlling member is actuated. Inexperienced operators, accustomed only to driving engine driven vehicles, tend to be unaware of the operating status of the battery operated vehicle because the vehicle normally remains totally silent and vibration free when the key switch is closed and there is no starting sequence, as is required in an engine driven vehicle. Inexperienced operators have thus tended to cause collisions between the electric vehicles and adjacent objects when the vehicles are inadvertently accelerated. Accordingly, in industrial applications relatively experienced personnel have operated the vehicles to insure against safety hazards.

Specialized traction battery chargers have also generally been required for recharging traction batteries of the vehicles. The prior art chargers have normally included transformers and associated electrical circuitry to accommodate available power supplies to charging voltage levels required by the traction batteries. The chargers have been relatively large, heavy and were normally stationed appropriately so that the vehicles could be driven to the chargers for periodic recharging. In some applications, the chargers were constructed for operation from polyphase power supplies which were available at a limited number of locations in a typical industrial facility. Furthermore, these chargers were relatively inefficient in that only about 80% of the power supplied to the chargers was actually utilized to charge the batteries.

Because of their weight, which is frequently due to the inclusion of a power transformer, the prior art chargers have not usually been installed on vehicles so that payloads can be maximized and power requirements for operating the vehicle reduced. The traction battery chargers have also been relatively expensive to purchase thus making the use of a few chargers for a larger number of vehicles practical. Vehicle traction batteries have thus not generally been rechargeable by supplying charging power directly to the vehicle, nor have the vehicles normally been rechargeable from a conventional A.C. "household" power supply outlet (e.g., 110-volt or 220-volt outlets).

In some facilities additional traction battery units have been obtained so that charged battery units are used as replacements for battery units which require recharging. This practice has enabled the chargers to be used to recharge batteries while the vehicles remain in service. Obtaining additional traction batteries is expensive and requires use of battery handling equipment to replace and recharge traction batteries which have been removed from the vehicle.

Recently advantages of electric powered vehicles, i.e., the absence of polluting emissions and minimal noise levels created during their operation, in addition to the lack of requirement for directly burning any fossil fuels for propulsion, have resulted in renewed interest in possible widespread usage of storage battery powered over-the-road vehicles. Advances in the construction of traction batteries, vehicles, and electric motors over the years have tended to enable weight reductions of electric over-the-road vehicles while increasing their efficiency. Furthermore reductions in fossil fuel availability at low cost has reduced the operating cost savings of internal combustion engines over electric prime movers.

Generally speaking, the practices developed in connection with recharging batteries of industrial-type electric vehicles have not been such that they can be easily adopted for use with over-the-road private passenger vehicles both because of the expense involved and the inconvenience to private nonindustrial users. Likewise the vehicles themselves are not readily adaptable to over-the-road passenger vehicle usage because of their weight, limited range, and low operating speeds.

While some general use over-the-road electric powered vehicles have been proposed, the prior art has not always provided vehicles which are: easily operated by relatively inexperienced and/or unskilled drivers who may be accustomed to operating only engine driven vehicles; rechargeable by users who may not have any appreciable degree of knowledge or sophistication in the use and operation of electrical equipment; rechargeable without requiring specialized expensive equipment and/or specialized electrical power supplies (such as polyphase power supplies which are usually only available at substantial cost for industrial usage); and, of relatively fail-safe construction so that the vehicles can be operated safely in the absence of regular maintenance and servicing.

SUMMARY OF THE INVENTION

The present invention provides a new and improved electric battery powered vehicle which simulates operation of an engine driven vehicle so that it is readily operated by inexperienced drivers and includes controls of fail-safe construction to insure that the vehicle is not operated when certain potentially unsafe conditions exist. The invention further provides a new and improved traction battery charger which enables full charging of traction batteries quickly at controlled, safe rates with a relatively high degree of operating efficiency. The new battery charger is a compact, lightweight unit which can readily be disposed on board the vehicle and operated from conventional readily available "household" type single or split phase A.C. power supplies.

One preferred form of the invention is illustrated and described as embodied in a storage battery powered over-the-road passenger car in which a traction battery unit powered electric drive motor propels the vehicle via a suitable change gear transmission. The motor is connectable in a motor energizing circuit with the traction battery unit by a running control, a motor speed control and a motor starting control.

An important feature of the invention resides in the motor starting control which is operable to simulate the starting sequence of an engine driven vehicle. The new motor starting control includes a starting control switch connected in the motor energizing circuit and circuitry powered from an auxiliary vehicle battery for governing operation of the starting control switch. The control switch is preferably constructed so that when in its closed condition the motor energizing circuit can be completed and when in its open condition the motor energizing circuit is interrupted.

The circuitry comprises a control switch operating element connectable to the auxiliary battery, an element controller of enabling the element to operate the switch to its closed condition in response to concurrent electrical signals to the element controller, and a simulated ignition switch having "OFF," "ON," and "START" positions. The simulated ignition switch is connected to the auxiliary battery, the element and the element controller so that the controller is provided with concurrent signals only when the simulated ignition switch is momentarily moved to its "START" position, after which the element controller maintains the element energized so long as the simulated ignition switch remains in its "ON" position.

Another feature of the preferred starting control resides in safety interlocks which are provided to prevent starting of the drive motor when any one of several potentially hazardous conditions are detected. In the preferred embodiment mechanical switches are employed for preventing concurrent signals from being provided to the element controller from the simulated ignition switch when the vehicle transmission is in any forward or reverse gear and/or when a contactor of the motor running control is closed, for example, by the contacts having been welded closed.

The element controller is preferably a gated semiconductor switch which is rendered conductive in response to concurrent signals to its gate electrode and one power electrode, after which it remains conductive even though no gate signal is provided. The mechanical switches referred to are connected in series with the gate electrode so that changes in the operating positions of the mechanical switches after the element controller is initially rendered conductive do not prevent continued operation of the vehicle.

A mechanical switch is also provided for preventing energization of the control switch operating element if the traction battery charger is in use when an attempt is made to start the vehicle. Additional mechanical switches can be employed as desired to prevent operation of the control switch by its operating element in response to detection of potentially unsafe conditions, such as an unlatched traction battery compartment access door.

Another important aspect of the invention resides in the provision of a new and improved traction battery charger construction which is lightweight, compact, relatively inexpensive and efficient, and highly effective in charging traction batteries. The new charger is sufficiently light and compact to be carried aboard the vehicle so that the vehicle can be connected to a suitable power supply for charging the batteries.

The new charger is constructed and arranged to be connected to a conventional "household" single-phase or split-phase grounded power supply. The charger unit is provided with power supply selector circuitry which determines which type of power supply is connected to the charger and automatically conditions the charger for charging the traction batteries from that power supply.

Another feature resides in an enabling circuit forming part of the charger which responds to operation of the power supply selector circuitry to permit charging unless the power supply ground circuit is interrupted, in which case battery charging cannot commence and a potentially hazardous condition is thus avoided. The enabling circuit is rendered effective in response to establishment of a conductive path formed in part by the circuit ground connection thus serving to check and assure the continuity of the circuit ground connection before charging current is supplied to the batteries. Conventional ground fault interrupters which may be associated with the power supply are not affected by the low level current drawn by the enabling circuit.

The new charger also provides charging control circuitry for controlling charging of the traction batteries to a maximum safe charge level quickly but at controlled rates so that possible damage to the traction batteries is avoided. The new charging control circuitry includes a semiconductor switch connected between the traction batteries and terminals of a power supply rectifier. The conductive condition of the semiconductor switch is altered for controlling the charging power supplied to the batteries.

The semiconductor switch is operated by a low voltage control circuit and a charge level sensing circuit which coact to govern the charging rate and level by controlling the semiconductor switch. When the traction batteries reach about an 80% charge level, at which gassing tends to occur, the charge level sensing circuitry and the low voltage control circuitry cooperate to reduce the charging power supplied to the traction battery as a function of the battery charge level so that the traction battery can be completely charged at progressively reduced rates to avoid possible damage. When the traction batteries are 100% charged the charger maintains the batteries in their fully charged condition by providing a source of charge sustaining current.

Other features and advantages of the invention will become apparent from the following description of a preferred embodiment made with reference to the attached drawings.

DESCRIPTION OF A PREFERRED EMBODIMENT

Figure 1:
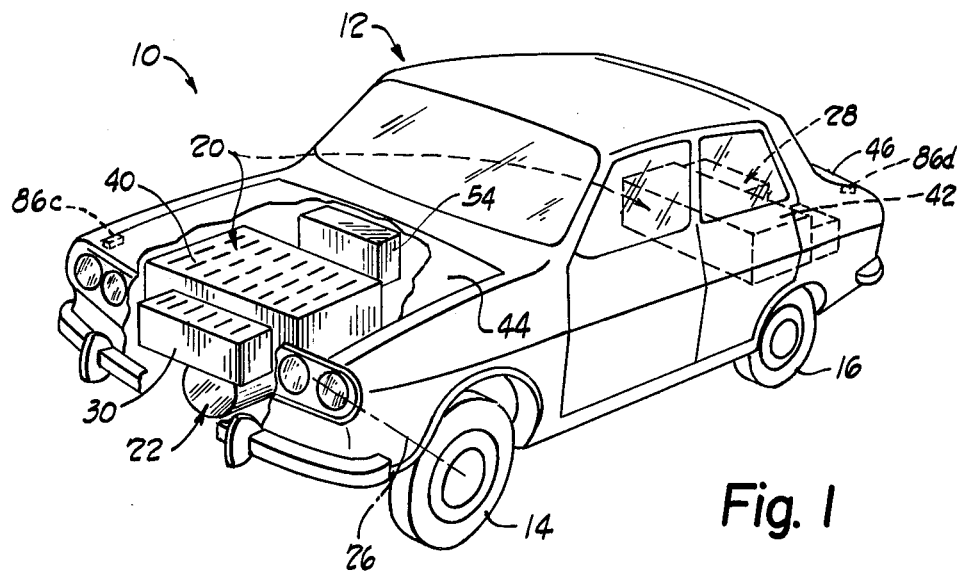
FIG. 1 is a schematic perspective view of a vehicle embodying the present invention.

A storage battery powered over-the-road vehicle 10 in the form of a passenger car is illustrated in FIG. 1. The vehicle 10 comprises a frame and body, generally indicated by the reference character 12, which is suspended from front and rear ground engaging wheel pairs 14, 16, respectively, and, a prime mover formed by a rechargeable traction battery unit 20 and associated electric drive motor 22 which are connected together by a motor control system 24 (see FIG. 2). The vehicle 10 is propelled by the drive motor 22 which drives the front traction wheels 14 through a suitable transmission which is schematically illustrated by the reference character 26. The vehicle 10 is equipped with an on-board traction battery charger 28 by which the traction battery unit 20 is rechargeable, and an auxiliary battery 30 (preferably a conventional 12-volt type automotive storage battery) used for operating auxiliary electrical equipment in the vehicle, such as the lights, radio, horn, etc.

The illustrated traction battery unit 20 is formed by battery packs 40, 42 each of which is preferably formed by a plurality of conventional series connected nominal 2-volt lead acid cells. The battery pack 40 produces a nominal 60 volts across its terminal while the battery pack 42 produces a nominal 36 volts across its terminals. The battery packs 40, 42 are connected in series with each other to produce a 96-volt D.C. power supply for operating the motor 22. The battery pack 40 is disposed with the motor 22 in a forward compartment of the vehicle body and is accessible via a conventional front deck lid 44 while the battery pack 42 is disposed in a rear compartment of the vehicle and is accessible through a rear deck lid 46. The location of the battery packs 40, 42 tends to equalize the vehicle wheel loadings.

The drive motor 22 is preferably a conventional D.C. series wound motor which is rated to develop about eight horsepower. Testing has shown that the use of a relatively low horsepower motor is sufficient to drive the vehicle 10 at road speeds up to 55 mph through a conventional automatic change gear transmission without substantially overloading or otherwise damaging the motor. Motors of the general size referred to are relatively lightweight, inexpensive, and compact. Larger motors which develop greater horsepower can, of course, be used if desired.

The actual construction of the motor and transmission and their relationship with the motor control system 24 may take any suitable form. Since the motor and transmission do not form part of the present invention they are not disclosed or described in further detail here.

Figure 2:
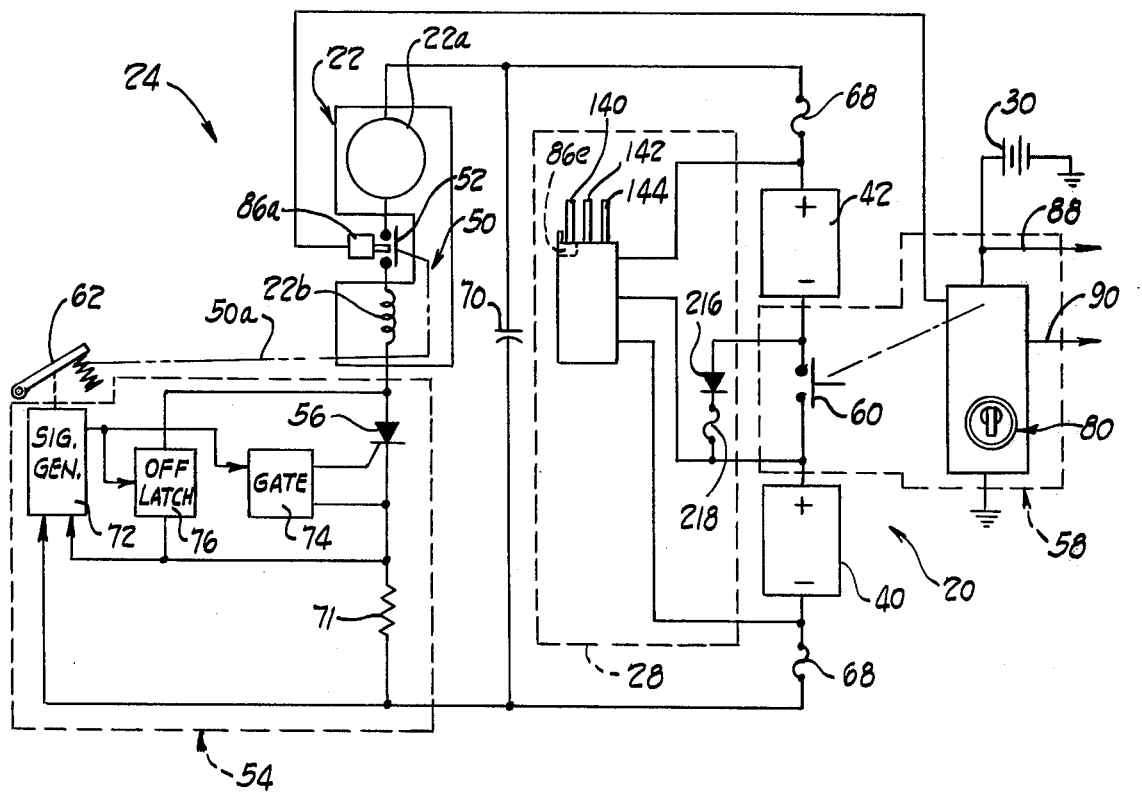
FIG. 2 is a schematic drawing of portions of the vehicle of FIG. 1.

The motor control system 24 is illustrated schematically in FIG. 2 and functions to interconnect the motor 22 with the traction battery unit 20 for propelling the vehicle. The control system 24 comprises a running control 50, including a running control switch 52 formed by a contactor, a motor speed control 54 including a semiconductor speed control switch 56, and a motor starting control 58 which comprises a starting control switch 60 formed by a suitable contactor. The switches 52, 56 and 60 are preferably connected in a series motor energizing circuit including the motor 22 and the traction battery unit 20 so that when all of the switches are in a conductive condition, or position, the motor is operated and if any one of the switches is nonconducting the motor energizing circuit is interrupted.

When the starting control switch 60 is closed, the motor control system 24 is conditioned to drive the motor 22 from the traction battery unit 20 when an accelerator pedal 62 (schematically illustrated in FIG. 2) is depressed. Depression of the accelerator pedal 62 causes the running control switch 52 to close and renders the speed control switch 56 conductive. This establishes a motor energizing circuit from the positive terminal of the traction battery unit 20 through the motor armature 22a, the closed contactor 52, the motor field windings 22b, the speed control switch 56 and to the negative terminal of the traction battery unit.

In the illustrated and preferred embodiment the running contactor 52 is connected to the accelerator pedal 62 by a suitable linkage, indicated at 50a, which is effective to close the running contactor 52 whenever the accelerator pedal is depressed, regardless of the degree of depression of the accelerator pedal. When the accelerator pedal is returned to its undepressed position the linkage 52a opens the contactor 50 to interrupt the energizing circuit and permit the motor 22 to coast.

As illustrated in FIG. 2, fuses 68 are provided in the motor energizing circuit in series with the traction battery unit 20 to avoid excessive motor current flow. A suitable filter capacitor 70 is connected across the traction battery unit terminals to suppress transients.

The motor speed control 54 intermittently operates the speed control switch 56 between its conductive and nonconductive conditions at frequencies which depend primarily upon the degree of depression of the accelerator pedal 62. The motor speed control 54 can be of any suitable or conventional construction but in the illustrated embodiment is a commercially available unit known as a "PULSOMATIC MK X" controller available from Cableform Ltd., a British company. The operative units of the motor speed control 54 are schematically illustrated as including the switch 56 and a motor current detecting resistor 71 in the motor energizing circuit, a signal generator 72, a gate control circuit 74, and an off latching circuit 76.

Operation of the switch 56 is controlled from the signal generator 72 which is linked to the accelerator pedal 62 and formed in part by an oscillator, not shown, which produces a pulsating variable frequency, constant amplitude and pulsewidth waveform whose frequency varies according to the degree of accelerator pedal depression. As the accelerator pedal is depressed, the output frequency from the signal generator increases. The waveform output from the signal generator 72 is input to the gate control circuit 74 and the off latching circuit 76 which coact to operate the switch 56 between its nonconductive and conductive conditions at rates dependent upon the output from the signal generator.

The switch 56 is rendered conductive by the gate control circuitry 74 when the output signal from the generator 72 reaches a predetermined positive-going amplitude. The off latching circuit 76 is connected across the switch 56 and is effective to latch the switch 56 off, i.e., render the switch nonconductive, as the amplitude of the output signal from the genrator reaches a predetermined negative-going magnitude. Accordingly the switch 56 is rendered conductive and latched off at predetermined times during each pulsation of the output signal from the generator 72 and the operating power supplied to the motor 22 via the switch 56 is modulated in accordance with the output signal frequency from the signal generator.

The motor speed controller 54 also functions to reduce the power supplied to the motor 22 in response to detected motor current levels above a predetermined level regardless of the degree of depression of the accelerator pedal. This is accomplished by connecting inputs to the signal generator 72 across the current sensing resistor 71. When excessive current levels exist in the motor energizing circuit the voltage drop across the resistor 71 is such that the generator 72 is conditioned to provide output signals at reduced frequencies which in turn reduce the amount of power supplied to the motor via the switch 56. Further details of the construction of the motor speed control circuit 54 are not necessary to an understanding of the invention and are therefore not illustrated or described further here.

Figure 3:
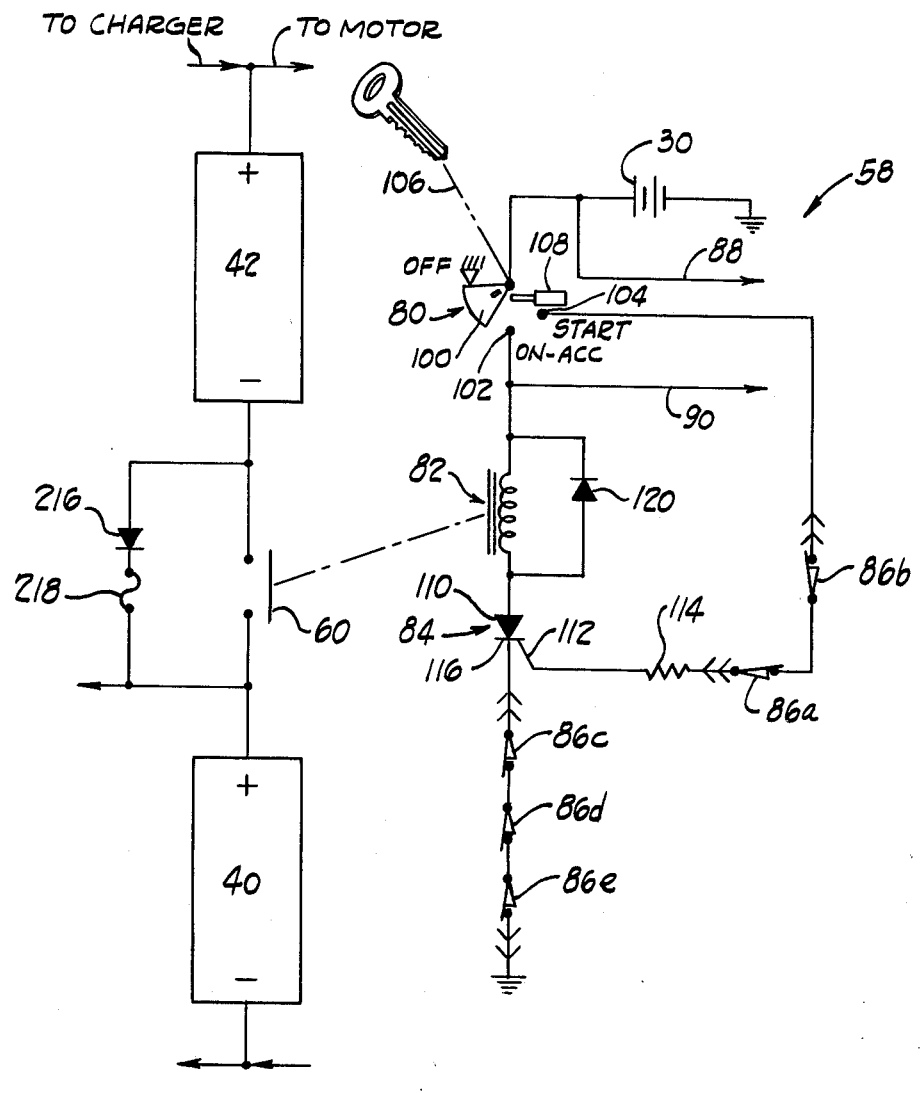
FIG. 3 is a schematic circuit diagram of a motor starting control forming part of the vehicle of FIG. 1; and, FIG. 4 is a schematic circuit diagram of a traction battery charger forming part of the vehicle of FIG. 1.

The motor starting control 58 is illustrated in FIG. 3 and is constructed and arranged to enable operation of the motor 22 in a manner which simulates the starting procedure of a conventional engine driven vehicle, provides safety interlocks to insure against operation of the motor 22 when unsafe, or potentially unsafe, conditions are detected, and enables operation of accessory equipment, such as a radio, blowers, etc., without the motor 22 being enabled. The motor starting control 58 is connected to the auxiliary battery 30 and includes a key operated simulated "ignition" switch assembly 80, a starting control switch operating element 82 for opening and closing the switch 60, an operating element controller 84, preferably formed by a gated electronic switch, and safety interlock switch elements 86a–e.

The vehicle 10 is provided with the usual electrical equipment and electrically operated accessories which are all powered from the auxiliary battery 30. An equipment power lead 88 for supplying power from the auxiliary battery to vehicle equipment such as the lights, horn, etc., is illustrated as connected to the positive terminal of the auxiliary battery 30 so that power can be supplied to that equipment without actuation of the simulated ignition switch assembly 80. An accessory equipment power lead 90, for supplying electrical power to the radio, blower, windshield wipers, etc., (not illustrated) is connected to the auxiliary battery 30 through the switch assembly 80 so that the accessory equipment is operable by operation of the key switch assembly 80 but without requiring that the starting control switch 60 be closed.

The switch assembly 80 comprises a three-position switch member 100 associated with an "ON-ACC." contact 102 and a "START" contact 104. The member 100 is manually operated to its positions by a key operated linkage 106 (schematically illustrated) which is constructed so that turning the key moves the switch member 100 from the illustrated "OFF" position to an "ON" position at which the member 100 engages the contact 102. Further turning of the "ignition" key actuates the linkage 106 to move the switch member 100 into conductive engagement with the "ON" contact 102 and the "START" contact 104 simultaneously.

The "ignition" switch assembly 80 is preferably constructed so that the switch member 100 simultaneously contacts the "ON" contact 102 and the "START" contact 104 momentarily or as long as the operator maintains the key in the "START" position. As soon as the key is released by the operator, a biasing element 108 operates on the switch member 100 to return the switch member to its "ON" position in which the member 100 engages only the "ON" contact 102. The biasing element 108 can be of any suitable construction and is therefore not illustrated in detail.

The element controller 84 is illustrated as an SCR which is rendered conductive to enable energization of the operating element 82 in response to concurrent electrical signals from the battery 30 via the switch assembly 80. The element controller 84 has its anode electrode 110 connected to the "ON" switch contact 102 via the operating element 82, its gate electrode 112 connected to the "START" terminal 104 via a suitable resistor 114 and limit switches 86a, 86b, and its cathode electrode 116 connectable to circuit ground through limit switches 86c–86e.

When the switch member 100 is moved from its illustrated "OFF" position to the "ON" position where the member 100 engages only the contact 102, the positive terminal of the auxiliary battery 30 is connected to the anode electrode 110 but the SCR is not rendered conductive since no signal is present at the gate 112. In this position of the switch member 100 the accessory equipment can be operated as desired via the power lead 90.

When the key is operated to move the member 100 to its "START" position, the SCR gate 112 is connected to the positive terminal of the battery 30 via the switch 86a, 86b and the contact 104 so that the SCR is rendered conductive by the concurrent signals to its anode and gate electrodes. The SCR is maintained conductive after the biasing element 108 returns the member 100 to the "ON" position in which the member 100 engages only the contact 102.

When the SCR is conductive the relay coil 82 is operatively energized from the battery 30 through the switch assembly 80, the anode and cathode electrodes 110, 116, respectively, of the SCR and the closed limit switches 86c–86e. Energization of the relay coil 82 closes the switch 60 to enable completion of the motor energizing circuit. A diode 120 is connected in parallel with the relay coil 82 and is poled oppositely from the SCR to isolate the SCR from inductive kicks created by the relay coil.

The limit switches 86a–86e are preferably disposed remote from the starting control 58 and are arranged to detect various conditions in which the drive motor 22 should not be operated. The limit switch 86a is operated by the running switch contactor 52 (see FIG. 2) and whenever the contactor 52 is closed the limit switch 86a is opened. The limit switch 86a is thus effective to prevent the starting control 58 from enabling operation of the motor 22 when the accelerator pedal is depressed as well as in the event the contactor 52 remains in its closed condition as a result of a malfunction, such as the contactor being welded in its closed condition. Such a malfunction could result in operation of the motor 22 without the accelerator pedal 62 being depressed.

The limit switch 86b is associated with the transmission gear selector (not shown) so that whenever the transmission is in any forward or reverse gear the limit switch 86b is opened.

It should be apparent that if either of the limit switches 86a, 86b is open prior to the motor starting sequence the motor cannot be started because of interruption of the circuit to the gate electrode 112. Once the SCR is rendered conductive the limit switches 86a and 86b can be opened without affecting the conductive state of the SCR or continued operation of the motor.

The limit switches 86c, 86d are associated with the front and rear deck lids 44, 46, respectively (see FIG. 1), so that when both deck lids are firmly closed the limit switches 86c, 86d are closed. If either the front or the rear deck lid is ajar or opened when an attempt is made to start the vehicle the corresponding limit switch is opened and disables the starting control 58. Likewise, if the motor 22 is enabled by the starting control and either deck lid is opened the starting switch 60 is immediately opened to prevent further operation of the motor.

The limit switch 86e is associated with the battery charger 28 (see FIG. 2) and is opened whenever a power supply is plugged to the battery charger. This prevents closure of the starting switch 60 and operation of the motor 22 with the battery charger 28 connected to a power supply.

Figure 4:
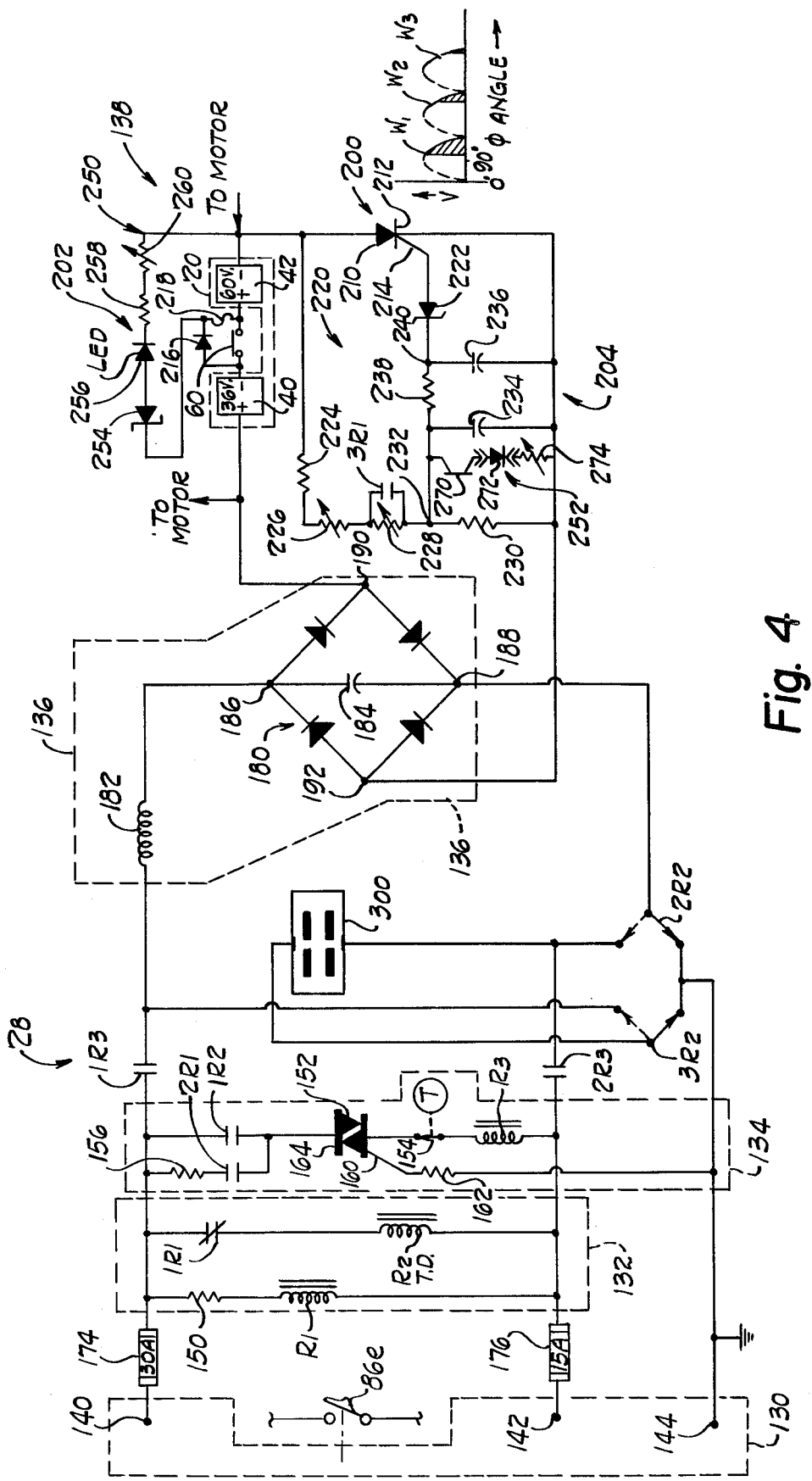

FIG. 4 schematically illustrates a traction battery charger 28 constructed according to a preferred embodiment of the invention. The battery charger 28 is a compact, lightweight, tranformerless unit which is effective to fully charge the traction batteries efficiently at relatively high controlled rates and is compatible with any conventional "household" type single or split phase grounded A.C. power supply simply by plugging the charger into the power supply. The preferred charger unit 28 is illustrated as being mounted on board the vehicle and includes a terminal structure 130, a power supply selector and cooperating charge enabling circuit 132, 134, respectively, which detect the type of power supply connected to the charger and enable charging of the traction battery unit 20 to commence, a rectifier unit 136 connected between the terminal structure 130 and the traction battery unit 20 for providing direct current charging power to the traction battery unit, and charging control circuitry 138 for governing the rate and extent of charging of the traction battery unit.

The terminal structure 130 is preferably formed by a plug-like unit (illustrated schematically in FIG. 2) having three projecting power terminals 140, 142, 144 for receiving a conforming female plug connector associated with a household three-wire A.C. power supply. The terminal 144 is connected to the power supply circuit ground and is also electrically connected to the chassis of the vehicle so that the vehicle is maintained at circuit ground whenever the terminal structure 130 is plugged to the power supply. The limit switch 86e is preferably disposed adjacent the power terminals 140, 142, 144 so that when the charger unit is connected to the power supply the contacts of the limit switch 86e are opened, as noted previously.

The charger is constructed for connection to a conventional three-wire phase A.C. household power supply or a split-phase higher voltage household power supply. These power supplies are standard and typically referred to as "110" volt A.C. power supplies, of the type which operate most household appliances, and "220" volt A.C. power supplies which are conventionally used to operate electric clothes dryers, cooking stoves, and other equipment requiring relatively larger amounts of operating power than can be supplied from a 110-volt power supply. For convenience these power supplies will be referred to as 110 V.A.C. and 220 V.A.C. supplies with the understanding that the voltage levels referred to are nominal rms values and can vary from locale to locale.

In the convention used here when a 110 V.A.C. power supply is plugged to the charger a nominal 110 V.A.C. appears across the terminals 140, 142 while the terminal 142 is connected to the power supply ground. If a 220 V.A.C. power supply is plugged to the charger 220 volts appears across the terminals 140, 142 while 110 volts appears across the terminals 142, 144. The terminal 144 is again connected to circuit ground.

The power supply selector circuitry 132 and the charge enabling circuitry 134 coact to automatically detect which type of power supply has been plugged to the charger and operate to control connection of the rectifier unit 136 to the power supply to assure that, regardless of which type of power supply is plugged to the charger terminals, 110 volts is supplied to the rectifier unit 136. The traction batteries are thus always charged by full-wave rectified nominal 110-volt power supplied from the rectifier unit.

The power supply selector circuitry 132 comprises a 220-volt sensing relay R1 which is connected across the terminals 140, 142 through a voltage dropping resistor 150, and a 110-volt sensing relay R2 which is connected across the terminals 140, 142 in parallel with the relay R1 via normally closed contacts 1R1 of the relay R1. The relay R1 and the resistor 150 are selected to coact so that the relay R1 is effectively energized to operate its associated contacts only when a power supply is plugged to the charger which provides substantially greater than 110 volts across the terminals 140, 142. The relay R2 can be operatively energized by a 110 V.A.C. (or greater) power supply connected across the terminals 140, 142. Thus when a 110 V.A.C. power supply is plugged to the charger the relay R2 is operatively energized from the power supply via the normally closed relay contacts 1R1. When a 220 V.A.C. power supply is plugged to the charger, the relay R1 is operatively energized and opens its contacts 1R1 to prevent energization of the relay R2.

The enabling circuitry 134 is rendered effective to interconnect the rectifier unit 136 and the traction battery unit 20 to the power supply in response to operation of the power supply detecting circuitry 132, provided that the power terminal 144 is effectively grounded. The enabling circuitry 134 comprises a gated A.C. enabling switch 152, a mechanical timer T having normally open contacts 154, a relay R3, parallel connected contacts 2R1 and 1R2 of the detector relays R1, R2, respectively, and a voltage dropping resistor 156 which is connected in series with the relay contacts 2R1. The enabling circuitry is connected across the terminals 140, 142 with the enabling switch 152, the timer contacts 154, and the relay R3 connected in series with the parallel connected relay contacts 2R1 and 1R2. The timer T, in the preferred embodiment, is a 12-hour mechanical timer which is manually set when the traction batteries are to be charged. Setting the timer T closes its contacts (as illustrated) until the timer has timed out in about 12 hours.

Assuming that a 220 V.A.C. power supply is connected to the charger 28 the relay R1 is energized, as described, to close its contacts 2R1 thus supplying power to the enabling circuitry 134 via the resistor 156.

The switch 152 is preferably of a type known as a "sensitive gate Triac" and includes a gate electrode 160 which is connected to the ground terminal 144 through a resistor 162. The switch 152 is rendered conductive whenever a predetermined relatively small current (for example, 3ma) flows in the gate electrode 160 via the resistor 162. There must, therefore, be continuity between the ground terminal 144 and the power supply circuit ground for the switch 152 to be rendered conductive. It should be noted that the amount of gate current required to render the switch 152 conductive is less than that which is detectable by ground fault interrupters which are provided in some household power supplies and which operate at current levels around 5ma to interrupt the power supply in response to a detected ground fault.

When the enabling switch 152 is rendered conductive, the relay R3 is energized to close its normally open contacts 1R3 and 2R3 which are connected, respectively, to the power terminals 140, 142. The relay R3 is preferably a "time delay" type relay so that the contacts 1R3 and 2R3 are closed a brief interval after the enabling switch 152 is rendered conductive. Energization of the relay R3 enables charging of the traction battery unit to commence by connection of the rectifier unit 136 across the terminals 140, 144 via a circuit from the terminal 140 through the closed relay contacts 1R3 to the rectifier unit 136 and from the rectifier unit 136 to the ground terminal 144 via double pole contacts 2R2 of the relay R2 (which are maintained in the position illustrated by virtue of the relay R2 remaining deenergized).

It should be noted that immediately upon plugging the 220-volt power supply to the charger unit 28 there may be a tendency for the relay R2 to be momentarily energized and shift the position of the contacts 2R2 from the illustrated position. Since the relay contacts 2R2 will quickly return to their illustrated position and the time delay operation of the relay R3 assures that the contacts 2R2 are in the position illustrated by FIG. 4 when the rectifier unit 136 is connected across the terminals 140, 144 by the relay contacts 1R3.

Charging the traction battery unit 20 from the 220 V.A.C. power supply commences as soon as the rectifier unit 136 has been connected across the terminals 140, 144 in the manner described.

Assuming that a 110 V.A.C. power supply connection is made with the charger 28, the relay R1 cannot be energized since the applied power is too low to cause the relay R1 to actuate its contacts. The relay R2 is energized resulting in closure of its contacts 1R2 in the enabling circuitry 134 and operation of its double pole contacts 2R2 to the broken line position shown in FIG. 4.

The enabling circuitry is operated in the manner described previously resulting in the relay R3 being energized to close its contacts 1R3, 2R3. Closure of the relay contacts 1R3, 2R3 connects the rectifier unit 136 across the terminals 140, 142 through a circuit from the terminal 140, the contacts 1R3, the rectifier unit 136, the relay contacts 2R2 (in their broken line position), the relay contacts 2R3 and to the power terminal 142. 110 volts is thus applied across the rectifier unit 136.

The relay R2 and/or its contacts 1R2 are constructed to provide a slight delay in the closure of the contacts 1R2 upon energization of the relay R2. This slight time delay is provided to insure that the relay R2 is not momentarily energized to close its contacts 1R2 when a 220 V.A.C. power supply is plugged to the charger. Momentary closure of the contacts 1R2 could conceivably damage the enabling switch 152 by the application of excessive voltage across it without the benefit of a resistor such as the resistor 156.

In the preferred embodiment of the invention, fuses 174, 176 are connected in series with the power terminals 140, 142, respectively. As noted previously, 220 V.A.C. power supplies are capable of providing a greater amount of power than a 110 V.A.C. power supply and, accordingly, when a 220 V.A.C. power supply is plugged to the charger unit 28 charging current is supplied through the fuse 174 which limits current flow to the rectifier unit to about 30 amperes. When the 110 V.A.C. power supply is plugged to the charger, the fuse 176 governs current flow to the rectifier unit and the fuse 176 permits no more than about 15 amperes to flow during charging from the 110 V.A.C. power supply.

The rectifier unit 136 preferably includes a conventional diode bridge 180 connected to provide full-wave rectified 110-volt power to the traction batteries during charging and a filter formed by a choke coil 182 and a capacitor 184. The filter blocks RF noise created by the charge control circuitry 138 and smoothens the power supply voltage waveform if that is necessary. The filter also functions to smoothen current flow in the rectifier but does not operate to filter 60 cycle A.C.

The diode bridge 180 provides input terminals 186, 188 across which 110 volts A.C. is provided and output terminals 190, 192 from which full wave rectified unfiltered direct durrent is provided to the traction battery unit 20 and the charge control circuitry 138.

It should be understood at this juncture that a typical lead acid storage battery provides power in the form of electrical current at a substantially constant nominal battery voltage. Thus the series connected battery packs 40, 42 forming the traction battery unit 20 is capable of producing motor operating current substantially at 96 volts until the batteries are nearly fully discharged. When charging such batteries, in order to obtain a full 100% charge, it is necessary to provide charging current to the batteries which results in the potential across the battery terminals (with no load on the batteries) rising above the nominal battery voltage. As soon as a load appears across the terminals of a 100%-charged battery, the battery voltage is reduced to its nominal level.

The 100%-charge condition of such batteries is thus a matter of definition and in the case of the traction battery unit 20, and most lead acid batteries, the battery is by definition fully charged when the no-load potential across the battery terminals exceeds the nominal voltage by 1.25 times (i.e., the nominal 96 voltage traction battery unit 20 is defined as fully charged when 120 volts appear across the battery terminals with no load applied).

The batteries can be damaged by charging in excess of their fully-charged condition and as a result of charging them at excessive rates. Batteries can be relatively quickly charged up to about 80% of their fully-charged condition but at that juncture "gassing" occurs and if the high charging rate is maintained battery damage will occur. Accordingly, batteries must either be charged at a uniformly low rate, charged only to about 80% of full charge at a high rate with charging then being terminated, or charged at a high rate to 80% and at reduced rates until a 100% charge level is obtained.

Batteries formed by individual cells, such as battery packs 40, 42, can be charged to produce a no-load potential across their terminals which is 1.25 times their nominal voltage level without each cell being fully charged. This occurs when some cells are "weak" relative to others and do not reach their 100% charged level while the stronger cells are slightly overcharged and produce more than 1.25 times their nominal voltage. In these circumstances, if a small charge sustaining current provided to the battery for a sufficient period of time after the battery reaches its fully-charged voltage level, the charge levels of individual cells equalize.

The charge control circuitry 138 enables 100% charging of the traction battery unit relatively quickly without damaging the traction battery as a result of overcharging or charging at excessive rates during the period when the battery is between 80% and 100% charged. The new charger is also effective to maintain the traction battery unit at 100% charge voltage level by providing a small charge sustaining current for substantial periods of time to enable individual cells of the traction battery unit to each assume its fully-charged condition. In the preferred embodiment, the charge control circuitry 138 comprises a charging control switch 200, charge level sensor circuitry 202, and low voltage circuitry 204 which coacts with the charge level sensing circuitry 202 to control operation of the charge control switch 200.

The switch 200 is preferably an electronic gated switch and is illustrated as an SCR having an anode electrode 210, a cathode electrode 212 and a gate electrode 214. When the SCR 200 is conductive, a charging circuit for the traction battery 20 is established from the rectifier output terminal 190 through the battery pack 40, a diode 216, a fuse 218, the battery pack 42 and to the negative rectifier terminal 192 via the SCR 200. The traction battery unit 20 is only charged when the instantaneous charging voltage applied across the rectifier unit output terminals 190, 192 exeeds the traction battery unit output voltage and then only when the switch 200 is conductive. In this regard it is noted that the peak charging voltage applied to the traction battery unit is in the vicinity of 160 volts when 110 V.A.C. is applied to the input terminals of the rectifier bridge (110 volts referring to the RMS voltage of the power supply). When the SCR 200 is nonconductive the charging circuit through the traction battery unit 20 is interrupted.

The diode 216 and fuse 218 enable charging of the traction battery unit with the starting control switch 60 in its open condition as illustrated. The diode 216 is poled to prevent interconnection of the battery packs 40, 42 to operate the drive motor when the switch 60 is open and the fuse 218 is connected in series with the diode 216 so that in the event the diode 216 fails by becoming conductive from its cathode to its anode, operation of the drive motor is prevented. The fuse 218 is sized to burn out when 50 amps or more pass through it. In the event the diode 216 fails the vehicle 10 cannot be moved since more than 50 amps is required for the motor to move the vehicle 10.

The low voltage control circuitry 204 controls the conductive state of the switch 200 to govern the charging rate of the traction battery unit. In the illustrated embodiment, the control circuitry 204 is constructed and arranged to control the power supply phase angles at which the switch 200 is rendered conductive. The switch 200 is rendered conductive during each power supply half cycle and charging power is provided to the traction battery unit during that portion of the half cycle in which the switch 200 is conductive and the charging voltage exceeds the battery voltage.

The control circuitry 204 comprises an RC timing circuit generally indicated at 220 and a triggering element 222 connected between the timing circuit 220 and the gate electrode 214 of the switch 200. The timing circuitry 220 comprises a voltage divider formed by a resistor 224, variable resistors 226, 228 and a resistor 230, and a capacitive charging circuit connected to the output junction 232 of the voltage divider. The capacitive charging circuit includes a capacitor 234 connected in series with the junction 232 and a capacitor 236 which is connected in parallel with the capacitor 234 and in series with the output junction 232 through a resistor 238.

The output voltage at the junction 232 provides a relatively low voltage full-wave rectified voltage waveform which is a phase with the power supply and by which the capacitors 234, 236 are charged. When the capacitors have charged to a predetermined level the switch 200 is rendered conductive via the trigger element 222.

The triggering element 222 is preferably an electronic breakdown device, illustrated as a Zener diode, connected between a junction 240 in the capacitive charging circuit and the gate electrode 214 of the switch 200. The Zener diode 222 is selected to conduct when a predetermined voltage level exists across the capacitor 236. When the element 222 is conductive the capacitors 234, 236 discharge through the junction 240, the element 222 and the gate 214 causing the SCR to conduct. The capacitors 234 and 236 cooperate to regularize the gate current to the SCR 200 as the capacitive charging circuitry is discharged. The switch 200 is no longer conductive at the end of each power supply half cycle, i.e., when the voltage across the rectifier output terminals 190, 192 reaches 0 volts.

The amplitude of the full-wave rectified unfiltered waveform output from the voltage divider is controlled by the values of the resistors 224, 226, 228 and 230. The resistors 226 and 228 are preferably variable to control the battery unit charging rate by controlling amplitude of the output waveform from the junction 232. The resistor 226 is adjusted so that its resistance value along with only the resistors 224 and 230 provides for a predetermined desired output from the junction 232 when the 220 V.A.C. power supply is plugged to the charger. The value of the resistor 228 is set so that its resistance, combined with the resistance value to which the resistor 226 is set and the values of the resistors 224 and 230 produce the desired output from the junction 232 when the 110 V.A.C. power supply is plugged to the charger.

When a 110 V.A.C. power supply is plugged to the charger unit, the capacitive charging circuit is charged from the output junction 232 during each half cycle of the power supply and the voltage level across the capacitor 236 rises sufficiently to render the switch 200 conductive during each such power supply half cycle. In the preferred and illustrated embodiment, the capacitive charging circuitry is constructed so that the switch 200 is rendered conductive only after a 90° phase angle of each power supply half cycle, (i.e., after the power supply voltage has peaked during each half cycle) to afford easy control over the phase angle at which the switch 200 is rendered conductive.

When a 220-volt power supply is plugged to the battery charger unit 28, energization of the 220-volt sensing relay R1 closes normally open contacts 3R1 in the voltage divider to shunt the resistor 228. This raises the instantaneous voltage levels appearing at the output junction 232 to increase the rate at which the capacitors 234, 236 charge. Accordingly, the switch 200 is rendered conductive earlier in each power supply half cycle so that a corresponding increase in the supply of battery charging power is provided to the traction battery unit.

The voltage waveforms appearing across the rectifier output terminals 190, 192 are schematically illustrated adjacent the switch 200 in FIG. 4 in terms of voltage level versus phase angle. The shaded portion of each half cycle indicates that portion of the half cycle during which the switch 200 is rendered conductive. The waveform W1 is indicative of operation of the charger unit 28 when a 220 V.A.C. power supply is plugged to it while the waveform W2 indicates operation of the charging unit 28 with a 110 V.A.C. power supply.

The charge level control circuitry 202 is formed by a voltage responsive signal generator 250 and a signal responsive controller 252 which is coupled to the signal generator 250 for effectively retarding the power supply phase angle at which the switch 200 is rendered conductive in response to operation of the signal generator 250. This operation results in "tapering" down the rate at which the traction battery unit is charged as the battery unit charges from its 80% level to its 100% charge level. The signal generator 250 comprises a voltage sensing element 254, a voltage responsive signal producing element 256 and resistors 258, 260, all of which, in the illustrated embodiment of the invention, are connected in series across the terminals of the battery pack 42. In the preferred and illustrated embodiment of the invention, the voltage sensing element 254 is formed by a Zener diode while the signal producing element 256 is formed by a light-emitting diode (LED). Light emitted by the LED 256 forms a signal by which the signal responsive controller 252 is operated.

When the battery pack 42 is approximately 80% charged the voltage across its terminals is approximately 69 volts. The Zener diode 254 is poled with its cathode connected to the positive terminal of the battery pack 42 and its anode connected to the negative terminal of the battery pack 42 via the LED 256 and the resistors 258, 260. The Zener diode 254 is selected so that when the battery pack voltage is approximately 69 volts it begins to conduct, thus rendering the signal generating circuit conductive. It should be pointed out here that the Zener diode is sufficiently insensitive to the 60-cycle pulsating battery charging voltage that it is not rendered momentarily conductive when 60-cycle voltage levels above 69 volts are applied across the battery pack 42.

The LED 256 thus begins emitting light at relatively low intensities. As the battery pack 42 is charged towards the 100% charge level its terminal voltage increases towards 75 volts and the intensity of the light emitted from the LED 256 increases progressively as a function of the battery voltage.

The resistors 258, 260 limit the current flow in the signal generator circuit 250 and the resistor 260 is variable to enable factory calibration of the light-emitting diode 256 so that the light-emitting diode operation can be regularized from unit to unit.

The signal responsive controller 252 responds to the level of light emitted from the LED 256 and coacts with the low voltage control circuitry 204 to effectively retard the power supply phase angle at which the SCR 200 is rendered conductive to reduce the charging power supplied to the traction battery unit. Optically coupling the low voltage control circuitry 204 with the charge level control circuitry (operating at 69 volts and above) electrically isolates these circuits in a convenient and uncomplicated manner.

In the preferred embodiment of the invention, the signal responsive controller 252 comprises a light-responsive transistor 270, a light-emitting diode 272 and a variable resistor 274 which are series connected with each other and in parallel with the voltage divider resistor 230. The transistor 270 and the signal producing LED 256 are formed by a single solid state device known as an "optoisolater" with the LED 256 forming, in effect, the base electrode of the transistor 270.

As the LED 256 begins to emit light the collector-emitter circuit of the transistor 270 begins to conduct via the second light-emitting diode 272 and the resistor 274 so that the output voltage level from the voltage divider is reduced. This, in turn, retards the rate at which the capacitors 234, 236 are charged during each half cycle of the power supply, thus retarding the phase angle at which the switch 200 is rendered conductive. As the intensity of the light emitted from the LED 256 increases the conductivity of the transistor 270 increases proportionately, further retarding the firing angle of the switch 200.

The light-emitting diode 272 is used as a signal lamp and is preferably mounted on a dash panel of the vehicle to indicate to the operator when the traction battery unit is at least 80% charged. The light-emitting diode 272 does not emit light until the transistor 270 is rendered conductive which only occurs after the battery pack 42 has been charged to its 80% level.

The variable resistor 274 is utilized to enable factory calibration of the level of conduction of the transistor 270 thus enabling calibration of the retardation of the phase angle at which the switch 200 is rendered conductive.

When the traction battery unit reaches its 100% charge level the charge level control circuitry has gradually reduced the charging power applied to the battery unit to a low charge sustaining level. Operation of the switch 200 in this condition is illustrated by the waveform W3 in FIG. 4. This level of charging activity continues until power supply is disconnected from the vehicle or until the timer T times out and deenergizes the relay R3 to open its contacts 1R3, 2R3 and terminate charging.

The timer T is utilized primarily as a safety device so that, in the event of a malfunction of the charge controlling circuitry causing continued high rate charging and/or substantial overcharging of the traction battery unit, structural damage to the traction battery unit and consequential damage to the vehicle can be avoided.

In the preferred embodiment of the invention, the battery charger unit 28 is provided with an auxiliary 110-volt receptacle, or outlet, 300 into which auxiliary 110-volt equipment may be plugged, such as a battery charger for the auxiliary 12-volt battery 30 and/or a fan, both of which may be used when the charger 28 is operating. The outlet 300 is associated with double pole contacts 3R2 of the 110-volt sensing relay R2 so that, regardless of whether the battery charger unit 28 is plugged to a 110 V.A.C. power supply or a 220 V.A.C. power supply, the outlet 300 is conditioned to provide 110 volts A.C. from the power supply. When the 220 V.A.C. power supply is plugged to the charger 28 the outlet 300 is connected to the charger power terminal 142 via the fuse 176, closed relay contacts 2R3 and to the ground terminal 144 via the relay contacts 3R2 which are positioned as illustrated by solid lines in FIG. 4.

When a 110 V.A.C. power supply is plugged to the charger unit 28 the outlet 300 is connected to the power terminal 140 via the fuse 174, closed relay contacts 1R3, the relay contacts 3R2 (which are operated to the broken line position illustrated in FIG. 4) and to the terminal 142 via the closed relay contacts 2R3 and the fuse 176.

The outlet 300 is not provided with any power until the enabling circuitry 132 has been rendered effective to close the relay contacts R3 and 2R3.

While a single embodiment of the invention has been illustrated and described in considerable detail the present invention is not to be considered limited to the precise construction shown. Various adaptations, modifications and uses of the invention may occur to those skilled in the art to which the invention relates and the intention is to cover all such adaptations, modifications, and uses which come within the scope or spirit of the attached claims.

What is claimed is:

1. A vehicle traction battery charger comprising:
   (a) terminal structure defining at least first and second terminals for connection to an A.C. power supply;
   (b) a rectifier connected across said first and second terminals and across terminals of a vehicle traction battery unit to provide D.C. charging power to said traction battery unit; and,
   (c) charging control circuitry for governing the charging power supplied to said traction battery unit comprising:
      (i) switching means connected in circuit with said traction battery unit and said rectifier, said switching means having a first condition wherein a charging circuit is established to said traction battery unit from said rectifier and a second normal condition wherein said traction battery unit is not charged;
      (ii) control circuitry for operating said switching means between said first and second conditions, said control circuitry producing periodic switch controlling signals which, at a predetermined value, operate said switching means to said first condition from said second condition so that said battery unit is charged at periodic intervals when said switching means is in said first condition;
      (iii) charge level control circuitry connected to said traction battery unit for detecting charge levels of said traction battery unit above a predetermined charge level and producing a charge level signal in the form of electromagnetic radiation which varies as the battery charge level approaches a fully charged level from said predetermined charge level; and,
      (iv) charge level signal responsive means associated with said control circuitry for altering the periodicity of said switch controlling signals to effectively reduce the charging rate of said traction battery unit as said unit approaches a fully charged level from said predetermined level, said charge level signal responsive means comprising a control element optically coupled to said charge level control circuitry and responsive to said electromagnetic radiation.

2. A vehicle traction battery charger comprising:
   (a) terminal structure defining at least first and second terminals for connection to an A.C. power supply;
   (b) a rectifier connected across said first and second terminals and across terminals of a vehicle traction battery unit to provide D.C. charging power to said traction battery unit; and,
   (c) charging control circuitry for governing the charging power supplied to said traction battery unit comprising:
      (i) switching means connected in circuit with said traction battery unit and said rectifier, said switching means having a first condition wherein a charging circuit is established to said traction battery unit from said rectifier and a second normal condition wherein said traction battery unit is not charged;
      (ii) control circuitry for operating said switching means between said first and second conditions, said control circuitry producing periodic switch controlling signals which, at a predetermined value, operate said switching means to said first condition from said second condition so that said battery unit is charged at periodic intervals when said switching means is in said first condition;
      (iii) charge level control circuitry connected to said traction battery unit for detecting charge levels of said traction battery unit above a predetermined charge level and producing a charge level signal which varies as the battery charge level approaches a fully charged level from said predetermined charge level, said battery charge level control circuitry comprising a battery voltage responsive signal generator having a battery voltage sensing element and a light emitting device rendered effective by said voltage sensing element to produce a voltage responsive light signal when the battery voltage reaches a predetermined level, said voltage responsive light signal varying in level as the battery voltage level increases above said predetermined level; and,
      (iv) charging signal responsive means associated with said control circuitry and optically coupled to said light emitting device for altering the periodicity of said switch controlling signals to effectively reduce the charging rate of said traction battery unit as said unit approaches a fully charged level from said predetermined level.

3. The battery charger claimed in claim 2 wherein said control circuitry comprises circuit elements for producing a switch controlling signal at said predetermined level during each half cycle of said power supply, said charging signal responsive means delaying the time during each power supply half cycle at which said circuit elements produce a switch controlling signal at said predetermined level.

4. A battery unit charger comprising:
   (a) structure defining terminals for connection to a three wire A.C. power supply comprising first and second power terminals and a third terminal connected to circuit ground;

(b) a rectifier unit connectable across two of said terminals and across terminals of a traction battery unit for supplying D.C. charging power to said battery unit;
(c) charging control circuitry for controlling the charging rate of said battery unit; and,
(d) enabling circuitry for connecting said rectifier across said terminals; said enabling circuitry comprising:
  (i) a control element operable to enable connection of said rectifier across said terminals; and,
  (ii) enabling switch means connected in circuit with said control element, said switch means rendered conductive to enable operation of said control element and rendered nonconductive to prevent operation of said control element, said enabling switch means including circuit elements defining a high impedance path from one of said first and second terminals to said third terminal, said circuit elements conducting a trickle current for rendering said enabling switch means conductive to enable operation of said control element in response to electrical continuity between said third terminal and said gate electrode.

5. The charger claimed in claim 4 wherein said enabling switch means is an electronic switch having its power electrode connectable to said first and second terminals and said circuit elements comprises a gate electrode of said switch, said switch rendered conductive to operate said control element in response to conduction between said third terminal and said gate electrode.

6. The charger claimed in claim 4 wherein the power supply is a single or a split phase power supply and further including power supply selector circuitry for detecting whether said power terminals are connected to a single or a split phase power supply and conditioning said charger for operation from the detected power supply.

7. The charger claimed in claim 4 wherein said enabling switch means is a sensitive gate A.C. semiconductor switch and said control element comprises a relay, said relay including a coil connected in series with said A.C. switch and at least a contact pair connected between said terminals and said rectifier unit.

8. A battery unit charger comprising:
(a) structure defining terminals for connection to a three wire A.C. power supply comprising first and second power terminals and a third terminal connected to circuit ground;
(b) a rectifier unit connectable across two of said terminals and across terminals of a traction battery unit for supplying D.C. charging power to said battery unit;
(c) charging control circuitry for controlling the charging rate of said battery unit; and,
(d) enabling circuitry for connecting said rectifier across said terminals; said enabling circuitry comprising:
  (i) a control element operable to enable connection of said rectifier across said terminals;
  (ii) enabling switch means connected in circuit with said control element for operating said control element, said enabling switch means including a circuit element for rendering said enabling switch means effective to operate said control element in response to detection of continuity between said third terminal and circuit ground; and,
  (iii) timer means for enabling connection of said rectifier to said terminals for a predetermined time, said timer means including switch contacts for enabling operation of said control element for a predetermined time and thereafter preventing operation of said control element regardless of the condition of said enabling switch means.

9. A battery unit charger comprising:
(a) structure defining terminals for connection to a three wire A.C. power supply comprising first and second power terminals and a third terminal connected to circuit ground;
(b) a rectifier unit connectable across two of said terminals and across terminals of a traction battery unit for supplying D.C. charging power to said battery unit;
(c) charging control circuitry for controlling the charging rate of said battery unit; and,
(d) power supply selector circuitry for detecting the power supply voltage level and conditioning said charger for operation by first or second power supply voltage levels;
(e) said power supply selector circuitry comprising:
  (i) first voltage level responsive means connected across said first and second terminals and rendered effective only in response to voltage levels above a predetermined level across said first and second terminals;
  (ii) second voltage level responsive means rendered effective in response to voltage levels above a second predetermined level across said first and second terminals, said second predetermined voltage level being substantially less than said first predetermined voltage level;
  (iii) first switch means responsive to said first voltage responsive means being rendered effective by at least a first predetermined voltage level for preventing said second voltage responsive means from being rendered effective; and,
  (iv) second switch means operated by one of said first and second voltage responsive means, said second switch means having a first condition for enabling connection of said rectifier unit between said first and third terminals when said first predetermined voltage level is established across said first and second terminals and a second condition for connecting said rectifier between said first and second terminals when the voltage level established across said first and second terminals is between said first and second predetermined voltage levels.

10. The charger claimed in claim 9 wherein said first voltage level responsive means comprises a first relay and said second voltage level responsive means comprises a second relay, said first relay including contacts connected in series with said second relay, said contacts of said first relay opening upon said first relay being rendered effecting and preventing said second relay from being rendered effective by said first predetermined voltage level.

11. The charger claimed in claim 9 wherein one of said voltage level responsive means is operatively associated with switch contacts having first and second positions, said contacts effective to connect said rectifier unit across said first and second terminals in one position and effective to connect said rectifier unit across said first and second terminals in one position and effective to connect said rectifier unit across one of said first and second terminals and said third terminal in said other position.

* * * * *